US011891849B2

(12) United States Patent
Matzek

(10) Patent No.: US 11,891,849 B2
(45) Date of Patent: Feb. 6, 2024

(54) APPARATUS AND CONTROL UNIT FOR AUTOMATING A STATE CHANGE OF A WINDOW PANE OF A VEHICLE

(71) Applicant: Bayerische Motoren Werke Aktiengesellschaft, Munich (DE)

(72) Inventor: David Matzek, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 492 days.

(21) Appl. No.: 17/288,305

(22) PCT Filed: Oct. 23, 2019

(86) PCT No.: PCT/EP2019/078803
§ 371 (c)(1),
(2) Date: Apr. 23, 2021

(87) PCT Pub. No.: WO2020/083962
PCT Pub. Date: Apr. 30, 2020

(65) Prior Publication Data
US 2021/0372192 A1 Dec. 2, 2021

(30) Foreign Application Priority Data
Oct. 26, 2018 (DE) ..................... 10 2018 126 830.0

(51) Int. Cl.
*G06F 17/00* (2019.01)
*E05F 15/77* (2015.01)
(Continued)

(52) U.S. Cl.
CPC ............ *E05F 15/77* (2015.01); *E05F 15/695* (2015.01); *E05F 15/79* (2015.01); *E05Y 2400/32* (2013.01);
(Continued)

(58) Field of Classification Search
CPC ......... E05F 15/77; E05F 15/695; E05F 15/79; E05F 15/70; E05Y 2400/32;
(Continued)

(56) References Cited

U.S. PATENT DOCUMENTS 6,590,357 B2 * 7/2003 Okamoto ............. G05B 19/042 318/467
6,701,673 B1 * 3/2004 Kessler .................. G01V 1/001 49/506
(Continued)

FOREIGN PATENT DOCUMENTS

CN 103774950 A 5/2014
CN 105863431 A 8/2016
(Continued)

OTHER PUBLICATIONS

FMVSS Considerations for Vehicles With Automated Driving Systems (Year: 2020).*
(Continued)

*Primary Examiner* — Ronnie M Mancho
(74) *Attorney, Agent, or Firm* — Crowell & Moring LLP

(57) ABSTRACT

An apparatus includes a control unit. The control unit is configured to determine a window point for an automatic change of state of a window pane of a vehicle. The control unit is also configured to determine event data for a plurality of window events in which an occupant of a vehicle has caused a change in the state of a window pane of the vehicle. The event data for a window event indicate a location at which the change of state of a window pane was effected. The control unit is also configured to determine at least one window point with a location at which a similar change of state of window panes was effected. The control unit is also configured to provide one or more vehicles with point data in relation to the determined window point, wherein the point data indicate the location of the window point and the
(Continued)

change of state of a window pane automatically effected at the window point.

10 Claims, 2 Drawing Sheets

(51) Int. Cl.
*E05F 15/695* (2015.01)
*E05F 15/79* (2015.01)

(52) U.S. Cl.
CPC ....... *E05Y 2400/42* (2013.01); *E05Y 2900/55* (2013.01)

(58) Field of Classification Search
CPC ............. E05Y 2400/42; E05Y 2900/55; E05Y 2900/50; E05Y 2400/30; E05Y 2400/44
USPC ............................................................ 701/36
See application file for complete search history.

(56) References Cited

U.S. PATENT DOCUMENTS

| | | | | |
|---|---|---|---|---|
| 9,617,777 | B2 * | 4/2017 | Aoshima | E05F 15/695 |
| 10,142,276 | B2 * | 11/2018 | Rapaport | H04N 21/8358 |
| 11,048,105 | B1 * | 6/2021 | Roy | G06F 3/041 |
| 11,260,753 | B2 * | 3/2022 | Lühr | H02J 7/0045 |
| 11,662,467 | B2 * | 5/2023 | Shani | G02B 26/08 356/5.01 |
| 2002/0171384 | A1 * | 11/2002 | Mersch | E05F 15/695 318/466 |
| 2005/0174079 | A1 * | 8/2005 | Mersch | B60J 7/0573 318/469 |
| 2006/0108874 | A1 * | 5/2006 | Kalb | E05B 81/80 307/10.2 |
| 2006/0191204 | A1 * | 8/2006 | Herwig | B60J 5/06 49/28 |
| 2006/0217879 | A1 | 9/2006 | Ikeuchi et al. | |
| 2007/0013324 | A1 * | 1/2007 | Ubelein | E05F 15/41 318/34 |
| 2009/0007493 | A1 * | 1/2009 | Hohn | E05F 15/695 49/506 |
| 2012/0191305 | A1 * | 7/2012 | Ersek | H02H 7/0851 701/49 |
| 2013/0305608 | A1 * | 11/2013 | Ersek | E05F 15/40 49/31 |
| 2015/0019083 | A1 * | 1/2015 | Kalliomaki | E05F 15/73 701/49 |
| 2015/0292253 | A1 * | 10/2015 | Hartmann | E05F 15/695 701/49 |
| 2018/0283889 | A1 * | 10/2018 | Koo | G01C 21/3484 |
| 2021/0164280 | A1 * | 6/2021 | Koenig | E05F 15/40 |
| 2021/0262275 | A1 * | 8/2021 | Demele | E05F 15/77 |
| 2021/0372192 | A1 * | 12/2021 | Matzek | E05F 15/79 |
| 2023/0150551 | A1 * | 5/2023 | Beaurepaire | B60W 60/005 701/23 |
| 2023/0295977 | A1 * | 9/2023 | Pohl | E05F 15/695 49/70 |

FOREIGN PATENT DOCUMENTS

| | | | |
|---|---|---|---|
| CN | 108590424 | A | 9/2018 |
| DE | 100 05 566 | A1 | 8/2001 |
| DE | 10 2015 223 613 | A1 | 6/2017 |
| DE | 10 2016 220 171 | A1 | 4/2018 |
| JP | 2017-133254 | A | 8/2017 |

OTHER PUBLICATIONS

Chinese-language Office Action issued in Chinese Application No. 201980068842.1 dated Mar. 14, 2022 with English translation (22 pages).
International Search Report (PCT/ISA/210) issued in PCT Application No. PCT/EP2019/078803 dated Feb. 13, 2020 with English translation (five (5) pages).
German-language Written Opinion (PCT/ISA/237) issued in PCT Application No. PCT/EP2019/078803 dated Feb. 13, 2020 (six (6) pages).
German-language Search Report issued in German Application No. 10 2018 126 830.0 dated Jul. 23, 2019 with partial English translation (10 pages).

* cited by examiner

APPARATUS AND CONTROL UNIT FOR AUTOMATING A STATE CHANGE OF A WINDOW PANE OF A VEHICLE

BACKGROUND AND SUMMARY OF THE INVENTION

The embodiments of the invention relate to an apparatus and control units that enable automatic control of a window pane of a vehicle.

During the operation of a vehicle, an occupant of the vehicle, in particular the driver, typically has to repeatedly open and close a window pane. For example, when driving on a toll road, it is required to open the window pane of the driver's door at various toll booths to pay a toll and then close it again. Repeated opening and closing of the window pane of a vehicle can be perceived as unpleasant or uncomfortable by an occupant of the vehicle. Furthermore, opening and closing the window pane of a vehicle can lead to reduced safety of the driving operation, since the driver of the vehicle is distracted by this activity at short notice.

This document deals with the technical object of increasing the comfort and/or safety of a vehicle when opening or closing a window pane of the vehicle.

This and other objects are achieved by the inventive apparatus disclosed herein. Advantageous embodiments are described, among other things, in the dependent claims. It should be noted that additional features of a claim dependent on an independent claim without the features of the independent claim or only in combination with a subset of the features of the independent claim may form a separate invention independent of the combination of all the features of the independent claim, which may be made the subject matter of an independent claim, a partial application, or a subsequent application. This applies in the same way to the technical teachings described in the description, which may form an independent invention which is independent of the features of the independent claims.

According to one aspect, an apparatus for determining a window point for an automatic change of state of a window pane of a vehicle is described. The apparatus may be arranged outside a vehicle to evaluate the event data of window events of a plurality of different vehicles. In this way, generally applicable window points can be detected or identified in a reliable and precise manner. Alternatively or additionally, the apparatus may be part of a vehicle for evaluating the event data of window events of the vehicle. In this way, vehicle-specific or user-specific window points can be detected or identified.

A window point can be used as a point (especially as a local position) at which a change in the state of a vehicle's window pane is typically caused (for example due to a toll booth, a drive-through restaurant, etc.). A detected window point can be used to automatically change the state of a vehicle window pane (so that the window pane no longer has to be manually opened or closed by an occupant of the vehicle (for example by operating a control panel)).

The apparatus is set up to determine event data for a plurality of window events in which an occupant of a vehicle has caused a change in the state of a window pane of the vehicle (for example by operating a control element, such as a toggle switch). The event data for a window event can indicate the location at which a window pane state was changed.

In addition, the event data for a window event of a vehicle can indicate or include:

- an identifier of a window pane identifying the window pane of a plurality of window panes of the vehicle for which a change of state has been effected (for example the window pane of the driver's door or the window pane of the passenger's door); and/or
- a type of effected change of state from a plurality of different types of changes of state; wherein the plurality of different types of changes of state include in particular: the opening or closing of the window pane; and/or
- a change (in particular a degree of change) of the degree of opening of the window pane, which was effected in the context of the window event.

In addition, the event data may indicate or include:

- a trajectory and/or a direction of the respective vehicle while driving to the location of the window event;
- a driving speed of the vehicle while driving to the location of the window event; and/or
- a time of day and/or a date and/or day of the week at or on which the window event took place; and/or
- a distance between the vehicle and a vehicle ahead;
- a side protection maintained by the respective vehicle or a lateral distance from an obstacle.

The event data for a window event can be determined by a vehicle based on one or more sensors of the vehicle, for example a position sensor for determining the location of the window event and/or the approach trajectory, a vehicle sensor for determining the driving speed and/or the steering angle of the vehicle, a window sensor for determining information regarding the change in the state of a window pane, an environment sensor for determining information relating to the vehicle's environment at the location of the window event, etc.

This allows event data to be collected for window events (for example for 10, 50, 100, 1000, 10000, or more window events). The window events within a specific region can be collected (for example for a specific city). The apparatus may be set up to determine at least one window point with a location at which a similar change of state of window panes was caused with relatively high frequency on the basis of the event data for the plurality of window events. Therefore a statistical evaluation of the event data may be carried out in order to identify or detect at least one window point or a location at which frequent changes of state of window panes occur. In this case, changes of state of the same type (for example, changes of state for opening a window pane or changes of state for closing a window pane) can be considered. This allows window events to be clustered.

In addition, the apparatus is set up to provide one or more vehicles with point data in relation to the detected window point (for example to send the point data). The point data can be used to indicate the location of the window point and the change of state of a window pane which is to be effected automatically at the window point. For example, the window data can be provided as part of digital map information related to a road network (for example as so-called points of interest, POIs).

In addition, the window data for a window point can indicate or include:

- the identifier of the window pane, which identifies the window pane of a plurality of window panes of a vehicle, for which a change of state is to be automatically effected; and/or
- a type of change of state to be automatically effected from a plurality of different types of changes of state; and/or a change of the degree of opening of the window pane to be automatically effected (in particular the extent of the change to be effected).

The point data for a window point can be used by a vehicle to automatically change the state of a window pane of the vehicle when the vehicle approaches the location of the window point. For example, when approaching a toll booth, the driver's door window pane can be opened automatically. A manual action of the driver of the vehicle is not required. The comfort and safety of a vehicle can thus be increased.

The apparatus may be set up to determine one or more trigger conditions for the change of state of a window pane to be effected at the window point. A trigger condition can indicate a condition that must or should be met so that the change of state of a window pane of a vehicle is automatically effected at the window point. The one or more trigger conditions can be provided as part of the point data of the window point.

Examples of trigger conditions are:

a condition relating to a trajectory and/or direction of the vehicle while driving to the location of the window point; and/or a condition relating to a driving speed of the vehicle while driving to the location of the window point; and/or a condition relating to a time of day and/or a date and/or day of the week at or on which driving to the location of the window point takes place; and/or a condition relating to a lateral distance from an object (for example from a pillar or a toll booth); and/or a condition relating to a minimum distance from a vehicle ahead (indicating that the vehicle is no longer in a queue).

As a result of taking into account one or more trigger conditions in relation to a window point, the comfort and safety of vehicles can be further increased. In particular, faulty automated changes of the state of window panes can be avoided.

The apparatus may be set up to determine trigger conditions based on the event data of the window events associated with the window point. For example, on the basis of the event data, the approach trajectory, the driving speed of a vehicle, etc. can be determined for a window point (for example as the average of the trajectories, driving speeds, etc. indicated by the event data of the individual window events).

Furthermore, the apparatus may be set up to cause the one or more vehicles, to which the point data in relation to the determined window point have been provided, to capture additional data for the window point during a plurality of trips. The additional data may indicate or include:

a trajectory and/or a direction of the vehicle when driving to the location of the window point;

a driving speed of the vehicle when driving to the location of the window point; and/or a time of day and/or a date and/or a day of the week at or on which the trip to the location of the window point takes place.

It is also possible to determine whether an automatically initiated change of state has been terminated and/or reversed by an occupant of a vehicle. This indicates that the change of state of a window pane should not be performed automatically (for example, if one or more trigger conditions is absent). The information relating to a termination or reversal of an automatically initiated change of state can be provided as additional data by a vehicle.

The one or more trigger conditions can then be determined on the basis of the additional data. As a result of requesting and collecting additional data, the one or more trigger conditions can be determined in a particularly precise manner. In this way, the comfort and safety of vehicles can be further increased.

According to a further aspect, a control unit is described for a vehicle comprising at least one window pane, wherein the window pane can be automatically opened and/or closed (in response to a user input).

The control unit is set up to detect a window event in which an occupant of the vehicle causes a change in the state of the window pane (for example by operating a control element). In this case, it is possible to check whether one or more event conditions are met. A window event may only be detected if one or more event conditions are met. On the other hand, a change of state of a window pane may not be detected as a window event. Examples of event conditions are:

A change in the state of the window pane is carried out, which reaches or exceeds a change threshold (for example a sufficiently large change in the degree of opening of the window pane); and/or The driving speed of the vehicle is at or below a speed threshold; and/or The window pane is essentially completely closed or opened; and/or The vehicle remains at the location of the window event for a minimum period of time; and/or The change of state is reversed after the expiry of a maximum period.

In addition, the control unit is set up to determine event data related to the window event. As explained above, the event data may, in particular, indicate the location at which the change of state of a window pane was effected.

The control unit is also set up to provide (for example via a communication link) the event data in relation to the window event of an apparatus (described in this document) for determining a window point for an automatic change of state of a window pane of a vehicle. The provision of event data enables the efficient and precise determination of window points at which an automatic change of state of window panes can take place. In this way, the comfort and safety of vehicles can be increased.

According to a further aspect, a control unit for a vehicle is described, which comprises at least one window pane, which can be opened and/or closed automatically. The control unit is set up to receive point data with respect to a window point from an apparatus (described in this document) for determining a window point for an automatic change in the state of a window pane of a vehicle. As explained above, the point data can indicate the location at which a change of state of the window pane indicated in the point data is to be automatically effected.

In addition, the control unit may be set up to determine location data with respect to a (current) location of the vehicle. The control unit may also be set up to automatically cause the change of state of the window pane indicated by the point data (without the need for user input) if the location data indicate that the vehicle is approaching the location indicated by the point data or is located at the location indicated by the point data. The comfort and safety of a vehicle can thus be increased.

In addition, the control unit may be set up to determine additional data in relation to a window point, in particular in response to a request of the apparatus described in this document. Due to the provision of additional data, the quality of the automatic changes of state of window panes can be further increased. As a result, the comfort and safety of vehicles may be further increased.

As explained above, the point data can display one or more trigger conditions that must be met so that the change of state of the window pane indicated by the point data is automatically effected at the location indicated by the point data. The control unit can be set up to verify or not that one or more trigger conditions are met when the vehicle is approaching the location indicated by the point data or is at the location indicated by the point data. Depending on the check, the change of state of the window pane indicated by the point data can then be effected automatically or not. As a result of taking into account one or more trigger conditions, incorrect changes of state can be avoided and thus the comfort and safety of vehicles can be further increased.

According to another aspect, a system is described which comprises the apparatus described in this document and the control unit of a vehicle described in this document (or the vehicle described in this document).

According to a further aspect, a road vehicle (in particular a passenger car or a truck or a bus) which comprises the control unit is described in this document.

In accordance with a further aspect, methods are described which correspond to the apparatus described in this document or a control unit described in this document.

According to another aspect, a software (SW) program is described. The SW program can be set up to be implemented on a processor (for example on a control unit of a vehicle) and thus to carry out one of the methods described in this document.

According to another aspect, a memory medium is described. The memory medium may include a SW program, which is set up to be implemented on a processor, and thus to carry out one of the methods described in this document.

It should be noted that the methods, apparatuses, and systems described in this document can be used both alone and in combination with other methods, apparatuses and systems described in this document. Furthermore, any aspect of the methods, apparatuses, and systems described in this document can be combined with each other in a variety of ways. In particular, the features of the claims can be combined in many ways.

Other objects, advantages and novel features of the embodiments of the present invention will become apparent from the following detailed description of one or more preferred embodiments when considered in conjunction with the accompanying drawings.

DETAILED DESCRIPTION OF THE DRAWINGS

Figure 1:
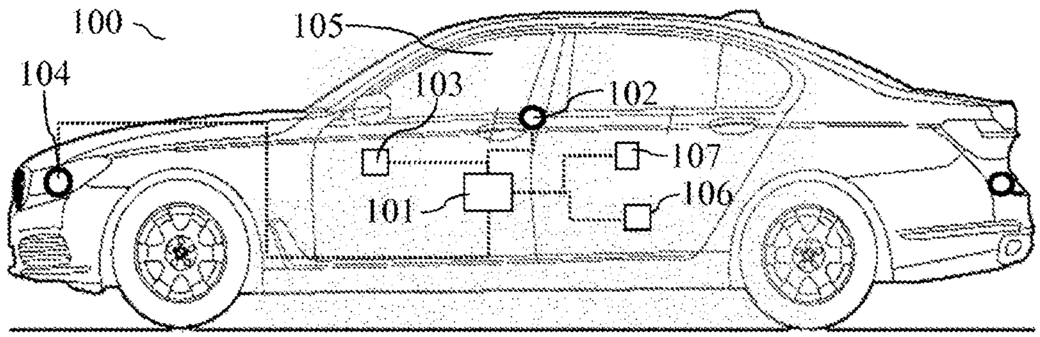
FIG. 1 depicts an exemplary vehicle.

As explained at the outset, this document deals with increasing the comfort and safety of a vehicle in relation to one or more automatic window panes of the vehicle, each of which can be opened and/or closed automatically. In this context, FIG. 1 shows an exemplary vehicle 100 with an automatic window pane 105, which is arranged on the driver's door of the vehicle 100 in the example shown.

The vehicle 100 comprises a window sensor 102, which is set up to provide window data which indicates the state, in particular the degree of opening, of the window pane 105. In addition, the vehicle 100 comprises a control element 103, which allows an occupant of the vehicle 100 to cause an actuator (for example an electric motor) of the vehicle 100 to open or close the window pane 105.

Furthermore, the vehicle 100 may comprise a position sensor 106 (for example a GPS receiver) that is set up to provide location data with respect to the current location of the vehicle 100. In addition, the vehicle 100 may comprise one or more environment sensors 104 (for example an imaging camera, a radar sensor, an ultrasonic sensor, and/or a lidar sensor) that are set up to capture environment data in relation to an environment of the vehicle 100. The vehicle 100 may also comprise a communication unit 107, which allows the vehicle 100 to exchange data with a unit which is external to the vehicle (for example with a central unit or with a backend server) via a (possibly wireless) communication connection. Examples of communication connections are a Bluetooth, a WLAN, a UMTS and/or an LTE connection.

A control unit 101 of the vehicle 100 may be set up to detect a window event based on the window data of the window sensor 102 and/or due to the operation of the control element 103, with which the state, in particular the degree of opening, of the window pane 105 is changed. In addition, the control unit 101 can be set up to determine event data for the window event (especially based on the environment data and/or the location data).

Examples of event data are

- the location at which the window event takes place;
- information regarding the change of state of the window pane 105, which takes place as part of the window event (for example the window pane 105 is opened or closed, and/or the degree of opening of the window pane 105 set as part of the window event);
- the driving speed of the vehicle 100 at which the window event takes place;
- a driving trajectory of the vehicle 100 in advance of the window event (for example at the time of the approach to the location at which the window event takes place);
- a time profile of the driving speed of the vehicle 100 in advance of the window event (for example during the approach to the location at which the window event takes place); and
- information regarding the environment of the vehicle 100 in which the window event takes place.

The control unit 101 of the vehicle 100 can be set up to send the event data in relation to the detected window event to a central unit via the communication unit 107.

Figure 2:
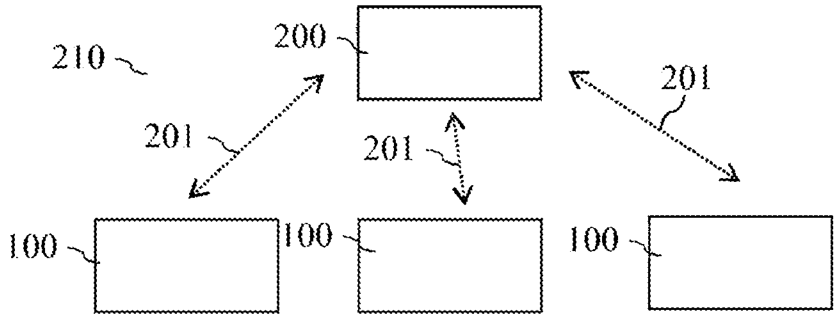
FIG. 2 depicts an exemplary system for controlling the window panes of vehicles.

FIG. 2 shows an exemplary system 210 for the automatic detection of one or more window points. The system 210 comprises a plurality of vehicles 100, wherein each vehicle 100 is set up to detect window events and to send event data relating to the detected window events via respective communication connections 201 to the central unit 200 (for example to a backend server).

The central Unit 200 is set up to identify one or more window points at which frequent window events occur based on the event data of the window events of the plurality of vehicles 100. A window point can indicate a specific location or position at which the occupants of vehicles 100 typically trigger a window event (for example because there is a toll booth or a drive-through restaurant at the location).

Furthermore, based on the event data of the window events of the plurality of vehicles 100, one or more attributes (also referred to in this document as point data) can be determined for a window point.

Examples of attributes are:

an identifier of the window pane 105 of a vehicle 100 for which a change of state is to be carried out;

the form or type of the change of state (for example, opening or closing the window pane 105, the degree of opening of the window pane 105 to be set, etc.);

the location of the window point (for example as GPS coordinates); and approach information regarding an approach to the window point (for example a trajectory and/or a profile of the speed of the vehicle 100 during an approach to the window point).

The window points, with one or more attributes, can be provided to one or more vehicles 100, for example as part of digital map information. For example, the one or more detected window points (with one or more attributes) can be sent to one or a plurality of vehicles 100 via communication connections 201.

The control unit 101 of a vehicle 100 may be set up to determine that the vehicle 100 is approaching a window point on the basis of the location data and/or on the basis of the environment data and/or on the basis of vehicle data (for example the time profile of the steering angle and/or the speed of the vehicle 100). One or more trigger conditions for an automatic change of state of a window pane 105 may also be checked. For example, it can be checked whether the vehicle 100 is approaching the location of the window point indicated in the attributes, and/or whether the vehicle is approaching the window point with the speed profile indicated in the attributes. It can therefore be checked whether one or more trigger conditions of a window pane are met (which are indicated in the point data of the window point).

If it has been determined that the vehicle 100 is approaching a window point, the actuator of the window pane 105 indicated by the point data can be controlled automatically to effect the change of state of the window pane 105 described in the point data. For example, when a toll booth is approached as a window point, the window pane 105 of the driver's door can be opened automatically. Furthermore, after passing through the toll booth at the exit of the toll booth (if necessary as another window point) the window pane 105 of the driver's door can be automatically closed again. In this way, the comfort and safety of a vehicle 100 can be increased.

The control unit 101 may also be set up to perform one or more other measures in advance of and/or at a (learned) window point. For example, based on the event data of the window event, it may be recognized that an automatic engine stop of the internal combustion engine of vehicles 100 is typically performed at a window point. Performing an engine stop at a window point can be used as an additional attribute of the window point and sent to one or more vehicles 100. A vehicle 100 can then automatically execute the engine stop indicated by the attribute (i.e. the point data) when the vehicle is 100 at the window point (possibly depending on the state of the electric on-board network of the vehicle 100). In this way, the comfort and energy consumption of vehicles 100 can be further enhanced.

The detection of one or more window points may be carried out by the control unit 101 of a vehicle 100. In particular, the control unit 101 of a vehicle 100 can be set up, based on the event data of window events of the vehicle 100, to detect one or more window points and to determine one or more attributes for a particular window point. The learning of window points can thus be done in an efficient and flexible manner within individual vehicles 100. In this way, the comfort and safety of a vehicle 100 can be further increased (particularly because individual preferences of the individual users of vehicles 100 can be better taken into account).

In this document a System 210 is thus described which provides for distributed learning of window points (also known in this document as POWI, Points of Window Interaction). For this purpose, window events can be detected by individual vehicles 100. A window event can be detected for example if the driving speed of the vehicle is zero and when the window pane 105 is opened at 60% or more. Event data for a detected window event can then be sent to a central unit 200. The event data may include the location of the window event, as well as a label indicating that the window event is a potential window point or POWI.

The individual potential window points or detected window events can be compared using algorithms. Points or locations where a window pane 105 state is changed relatively frequently (for example, where a window pane 105 is opened relatively frequently) can be identified and stored as window points. Furthermore, one or more attributes of a window point can be determined and stored.

For an identified window point, requests can be placed on vehicles 100 to provide further event data (in this document also referred to as additional data) for the window events at a window point (such as the approach trajectory and/or the direction of approach to the location of a window point). Based on the additional data, one or more other attributes of a window point can be determined, which can be used as trigger conditions for the change of state of the window pane 105. For example, a specific approach trajectory, a specific approach direction and/or a specific approach speed to the window point are determined as a trigger condition for the automatic change of state and are provided as an attribute or as point data. In addition, a classification of different types of window points (such as for example toll booth, parking space, parking garage, drive-through restaurant, etc.) are determined and provided as an attribute or as point data.

In addition, a regular check of already recognized window points can be performed on the basis of the event data of current window events and/or on the basis of additional data. In particular, it is possible to check whether window events continue to occur at a detected window point or not. This can increase the reliability of provided window points.

Figure 3A:
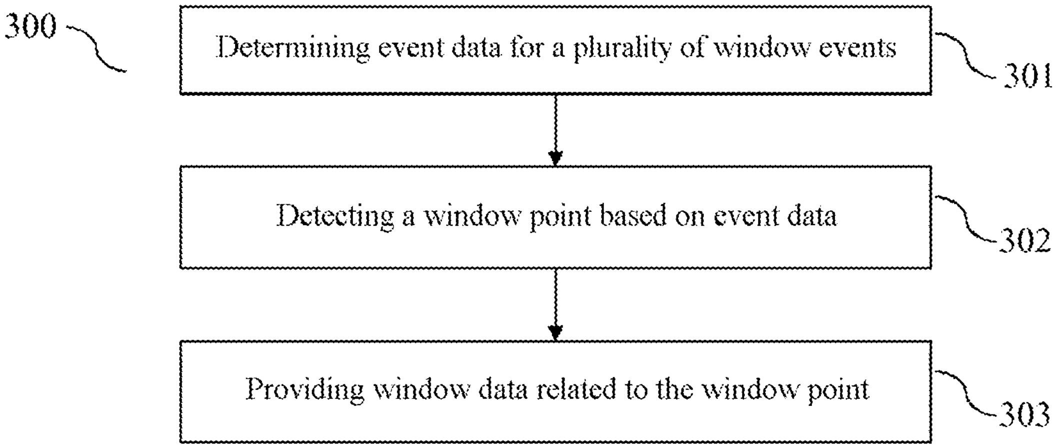
FIG. 3*a* depicts a flow diagram of an exemplary method for providing event data.

FIG. 3*a* shows a flow diagram of an exemplary method 300 for the determination of a window point for an automatic change of state of a window pane 105 of a vehicle 100. The method 300 can be carried out centrally for a variety of vehicles 100 by a central unit 200. Alternatively or in addition, the method 300 can be carried out locally by the control unit 101 of a vehicle 100.

The method 300 involves the determination 301 of event data for a plurality of window events in which a change of state of a window pane 105 of a vehicle 100 was effected by an occupant of a vehicle 100 (for example by operating a control element). The event data for a window event can indicate the location (for example as GPS coordinates) at which the change of state of a window pane 105 was effected.

In addition, the event data for a window event can indicate or include: an identifier of a window pane 105 of which a change of state was effected, which identifies the window pane 105 from a plurality of window panes 105 of the vehicle 100; a type of effected change of state from a plurality of different types of changes of state, wherein the plurality of different types of changes of state includes, for example, opening or closing the window pane 105; and/or a change (in particular the extent of the change) of the degree of opening of the window pane 105, which was effected in the context of the window event.

In addition, the method 300 includes the determination 302, based on the event data for the plurality of window events, of at least one window point with a location at which a similar change of state of window panes 105 has been effected with relatively high frequency. In other words, at least one location at which changes of state of window panes 105 of a certain type of changes of state were effected with relatively high frequency can be determined on the basis of event data for the plurality of window events. A window point can be defined for this location.

Furthermore, the method 300 involves providing 303 point data with respect to the determined window point for one or more vehicles 100. For example, the point data can be sent to one or more vehicles 100 over a (wireless) communication connection 201. Alternatively or in addition, the point data can be stored on a memory unit of the one or more vehicles 100. In this case, the window data are provided in particular as part of digital map information in relation to a road network (for example as a so-called point of interest (POI)).

The point data may be the location of the window point and the change of state of a window pane 105 which is to be automatically effected (for example the type of change of state and/or the extent of the change in the opening angle to be effected). Furthermore, the point data may include the identifier of the window pane 105, which indicates the window pane 105 of a vehicle 100 for which an automatic change in state is to be effected.

Figure 3B:
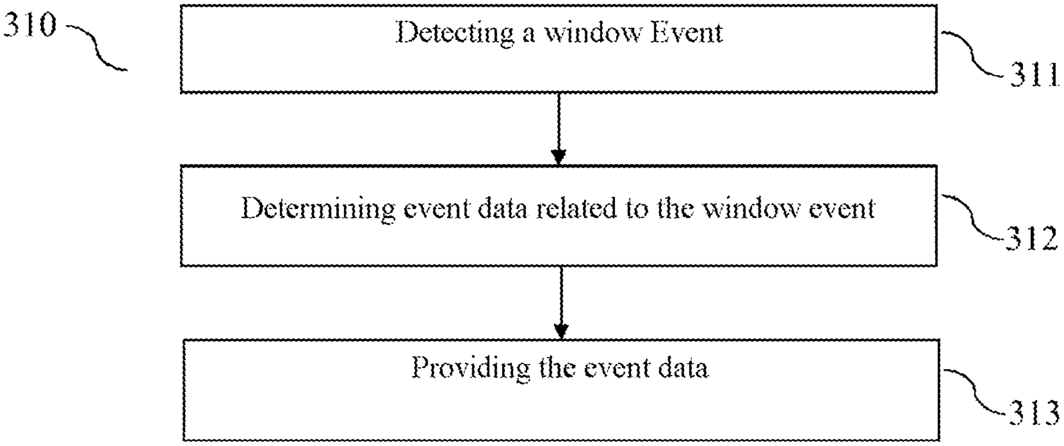
FIG. 3*b* depicts a flow diagram of an exemplary method for detecting window points.

FIG. 3*b* shows a flow diagram of an exemplary method 310 for providing event data for a window event. The method 310 can be carried out by a control unit 101 of a vehicle 100. In this case, the vehicle 100 comprises at least one window pane 105, which can be opened and/or closed automatically (in response to a user input at a control element 103 of the vehicle 100).

The method 310 involves detecting 311 a window event in which a change of state of the window pane 105 is effected by an occupant of the vehicle 100 (for example by operating the control element 103). In order to detect a window event, it is possible to verify that one or more event conditions for the existence of a window event are met (for example a sufficiently high degree of change of the opening angle of the window pane 105 and/or a sufficiently low driving speed of the vehicle 100).

In addition, the method 310 involves determining 312 event data related to the window event. In particular, the event data may indicate the location at which the change of state of a window pane 105 was effected. Furthermore, the event data may indicate the identifier of the window pane 105 on which the change of state was effected. In addition, the event data may be the type of the change of state (for example opening or closing) and/or the extent of the change in the opening angle.

Furthermore, the method 310 involves providing 313 the event data in relation to the window event to an apparatus 200, 101 for determining a window point. In other words, the event data may be provided for the determination of one or more window points. For this purpose, the event data may be sent via a (wireless) communication connection 201 to a central unit 200 and/or provided within the vehicle to a control unit 101.

Figure 3C:
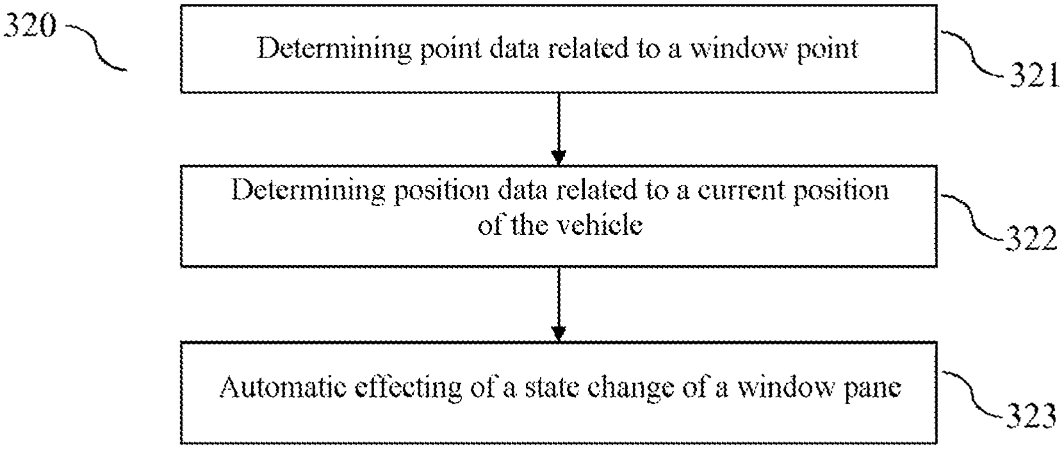
FIG. 3*c* depicts a flow diagram of an exemplary method for controlling a window pane of a vehicle.

FIG. 3*c* shows a flow diagram of an exemplary method 320 for controlling a window pane 105 of a vehicle 100, wherein the window pane 105 can be opened and/or closed automatically (for example by means of an electric window lifter). The method 320 can be carried out by a control unit 101 of the vehicle 100.

The method 320 includes receiving and/or determining 321 point data related to a window pane. The point data can be provided by an apparatus 200, 101 for determining a window point for an automatic change of state of a window pane 105 of a vehicle 100.

The point data may indicate a location at which a change of state of the window pane 105 should be automatically effected. In addition, the point data may indicate the type of change of state to be effected and/or the extent of the change of state to be effected. In addition, the point data may indicate the identifier of the window pane for which a change of state is to be effected. In addition, the point data may indicate one or more trigger conditions that must be met for a change of state of the window pane 105 to be automatically effected.

In addition, the method 320 includes the determination 322 of location data in relation to a location of the vehicle 100. The location data may be determined by means of a position sensor 106.

Furthermore, method 320 includes the automatic effecting 323 of the change of state of the window pane 105 indicated by the point data, if the location data indicate that the vehicle 100 is approaching the location indicated by the point data or is at the location indicated by the point data. The change in state can be effected without the need for an action by an occupant. In particular, the change in state can be effected without a control element 103 of the vehicle 100 being operated for this purpose.

As a result of the measures described in this document, learning global window points and making these available to a plurality of vehicles 100 can be made more flexible, efficient, and reliable. By means of distributed learning of window points, resources can be saved in data transfer and processing in a central unit 200. Event data related to a window event are typically captured and evaluated or collected for individual window events. In this way, resources in a vehicle 100 can be reduced (especially in terms of computing power).

The embodiments of the present invention are not limited to the exemplary embodiments shown. In particular, it should be noted that the description and the figures are only intended to illustrate the principle of the proposed methods, apparatuses, and systems.

What is claimed is:

1. An apparatus comprising:

a control unit configured to determine a window point for an automatic change of state of a window pane of a vehicle, wherein the control unit is configured to:

determine event data for a plurality of window events in which an occupant of a vehicle has caused a change in the state of a window pane of the vehicle, wherein the event data for a window event indicate a location at which the change of state of a window pane was effected;

determine at least one window point with a location at which a similar change of state of window panes was effected; and provide one or more vehicles with point data in relation to the determined window point, wherein the point data indicate the location of the window point and the change of state of a window pane automatically effected at the window point.

2. The apparatus according to claim 1, wherein the control unit is configured to determine one or more trigger conditions for the change of state of a window pane to be effected at the window point, a trigger condition indicates a condition that must be met in order for the change of state of a window pane of a vehicle to be effected automatically at the window point, and the point data include the one or more trigger conditions.

3. The apparatus according to claim 2, wherein the one or more trigger conditions include:

a condition relating to a trajectory and/or a direction of the vehicle when driving to the location of the window point; and/or a condition relating to a driving speed of the vehicle when driving to the location of the window point; and/or a condition relating to a time of day and/or a date and/or a day of the week at which or on which a trip to the location of the window pane is carried out.

4. The apparatus according to claim 3, wherein the control unit is also configured to:

determine the one or more trigger conditions based on the event data of the window events associated with the window point; and/or cause the one or more vehicles to which the point data in relation to the determined window point has been provided, to capture additional data for the window point for a plurality of trips and to provide the additional data to the control unit; and determine the one or more trigger conditions based on the additional data.

5. The apparatus according to claim 4, wherein the control unit is also configured to provide the window data as part of digital map information in relation to a road network.

6. The apparatus according to claim 5, wherein the point data include or indicate:

an identifier of a window pane which identifies the window pane of a plurality of window panes of a vehicle for which a change of state is to be effected automatically; and/or a type of change of state to be automatically effected from a plurality of different types of changes of state; and/or a change in the degree of opening of the window pane effected automatically.

7. An apparatus for a vehicle which has at least one window pane, and which can be opened and/or closed automatically the apparatus comprising:

a control unit that is configured to:

detect a window event in which an occupant of the vehicle causes a change of state of the window pane, determine event data related to the window event, wherein the event data indicate a location at which the change of state of a window pane was effected, and provide the event data relating to the window event to the control unit, so that the control unit determines a window point for an automatic change of state of a window pane of a vehicle.

8. The apparatus as claimed in claim 7, wherein a window event is detected if one or more of the following event conditions exist:

a change of state of the window pane takes place, which reaches or exceeds a change threshold; and/or a driving speed of the vehicle is at or below a speed threshold; and/or the window pane is essentially completely closed or opened; and/or the vehicle remains at the location of the window event for a minimum period of time; and/or the change of state is reversed after a maximum period has elapsed.

9. An apparatus for a vehicle which has at least one window pane, and which can be opened and/or closed automatically, the apparatus comprising:

a control unit that is configured to:

receive point data relating to a window point to then determine a window point for an automatic change of state of a window pane of a vehicle, wherein the point data indicate a location at which the change in the state of the window pane is to be automatically effected, determine location data relating to a location of the vehicle, and automatically effect the change of state of the window pane indicated by the point data when the location data indicate that the vehicle is approaching the location indicated by the point data or is at the location indicated by the point data.

10. The apparatus as claimed in claim 9, wherein the control unit is configured to determine additional data relating to the window point, in response to a request, and the additional data include:

a trajectory and/or a direction of the vehicle when driving to the location of the window point, a driving speed of the vehicle when driving to the location of the window point, and/or a time of day and/or a date and/or a day of the week at or on which the trip to the location of the window point is made.

* * * * *